United States Patent
Ma et al.

(10) Patent No.: US 9,935,667 B2
(45) Date of Patent: Apr. 3, 2018

(54) OBTAINING ON-LINE SERVICE

(71) Applicant: Harman International Industries, Inc., Stamford, CT (US)

(72) Inventors: Jianjun Ma, Shanghai (CN); Xiaopei Huang, Shanghai (CN); Jian Kang, Shanghai (CN)

(73) Assignee: HARMAN INTERNATIONAL INDUSTIRES, INCORPORATED, Stamford, CT (US)

( * ) Notice: Subject to any disclaimer, the term of this patent is extended or adjusted under 35 U.S.C. 154(b) by 11 days.

(21) Appl. No.: 14/646,716

(22) PCT Filed: Dec. 24, 2013

(86) PCT No.: PCT/CN2013/090298
§ 371 (c)(1),
(2) Date: May 21, 2015

(87) PCT Pub. No.: WO2014/101745
PCT Pub. Date: Jul. 3, 2014

(65) Prior Publication Data
US 2015/0333787 A1    Nov. 19, 2015

(30) Foreign Application Priority Data
Dec. 27, 2012 (CN) .......................... 2012 1 0581535

(51) Int. Cl.
*H04L 29/08* (2006.01)
*H04B 1/3822* (2015.01)
(Continued)

(52) U.S. Cl.
CPC ....... *H04B 1/3822* (2013.01); *H04L 65/4084* (2013.01); *H04L 65/605* (2013.01);
(Continued)

(58) Field of Classification Search
CPC ............................. H04W 84/18; H04W 84/12
See application file for complete search history.

(56) References Cited

U.S. PATENT DOCUMENTS

| | | | |
|---|---|---|---|
| 2002/0046315 A1* | 4/2002 | Miller | ................... G06F 9/4443 711/1 |
| 2007/0061725 A1* | 3/2007 | Isaac | .................. H04N 7/17318 715/717 |

(Continued)

FOREIGN PATENT DOCUMENTS

| | | |
|---|---|---|
| CN | 1834584 A | 9/2006 |
| CN | 202463722 U | 10/2012 |

(Continued)

OTHER PUBLICATIONS

Extended European Search Report Application No. 13868971.6, dated Jul. 18, 2016, 8 pages.

(Continued)

*Primary Examiner* — Zhiren Qin
(74) *Attorney, Agent, or Firm* — Artegis Law Group, LLP

(57) ABSTRACT

Method and system for obtaining on-line service are provided. The method may include: a vehicle mounted system sending a first piece of information about its capability and a request for an on-line service to a mobile communication device connected to the vehicle mounted system; and the vehicle mounted system receiving contents of the on-line service from the mobile communication device, where the contents of the on-line service are obtained by processing to match the capability of the vehicle mounted system. Computation load of the vehicle mounted system may be reduced and more utilization may be realized.

16 Claims, 3 Drawing Sheets

(51) Int. Cl.
*H04M 3/42* (2006.01)
*H04L 29/06* (2006.01)
*H04W 84/00* (2009.01)

(52) U.S. Cl.
CPC .......... *H04L 67/12* (2013.01); *H04L 67/2823* (2013.01); *H04M 3/42* (2013.01); *H04W 84/005* (2013.01)

(56) References Cited

U.S. PATENT DOCUMENTS

| | | | | |
|---|---|---|---|---|
| 2007/0279427 | A1* | 12/2007 | Marks | H04N 5/2226 345/581 |
| 2008/0039115 | A1 | 2/2008 | Haugli et al. | |
| 2008/0039153 | A1 | 2/2008 | Katoh et al. | |
| 2008/0319652 | A1* | 12/2008 | Moshfeghi | G01C 21/3667 701/532 |
| 2010/0138149 | A1* | 6/2010 | Ohta | G01C 21/26 701/533 |
| 2010/0279629 | A1* | 11/2010 | Srinivasan | H04B 1/034 455/74 |
| 2011/0145863 | A1 | 6/2011 | Alsina et al. | |

FOREIGN PATENT DOCUMENTS

| | | |
|---|---|---|
| CN | 202502739 | 12/2012 |
| CN | 202617170 U | 12/2012 |
| EP | 1972895 A2 | 9/2008 |
| EP | 2466262 A2 | 6/2012 |

OTHER PUBLICATIONS

International Search Report for Application No. PCT/CN2013/090298, dated Mar. 27, 2014.

* cited by examiner

OBTAINING ON-LINE SERVICE

CROSS-REFERENCE TO RELATED APPLICATIONS

The present application is a national stage application of the international application titled, "OBTAINING ON-LINE SERVICE," filed on Dec. 24, 2013 and having application number PCT/CN2013/090298. This international application claims priority to the Chinese patent application titled, "METHOD FOR USING A SMART PHONE TO RECEIVE ON-LINE RADIO PROGRAM IN A VEHICLE-MOUNTED HEAD UNIT," filed on Dec. 27, 2013 and having application number 201210581535.3. The subject matter of these related applications is hereby incorporated herein by reference.

TECHNICAL FIELD

The present disclosure generally relates to obtaining data of an on-line service in a vehicle-mounted device.

BACKGROUND

Nowadays, more and more consumers want to enjoy on-line services when they are driving a vehicle. However, some vehicles do not have equipment for internet connection. For providing on-line services in such vehicles, in some solutions, a smart phone may be set as a hotspot and a communication device mounted-on such vehicle may receive on-line data through the hotspot.

SUMMARY

According to one embodiment, a method for obtaining on-line service is provided. The method may include: a vehicle mounted system sending a first piece of information about its capability and a request for an on-line service to a mobile communication device connected to the vehicle mounted system; and the vehicle mounted system receiving contents of the on-line service from the mobile communication device, where the contents of the on-line service are obtained by processing to match the capability of the vehicle mounted system.

In some embodiments, the processing is partially conducted by a server which provides the on-line service and partially conducted by the mobile communication device.

In some embodiments, the mobile communication device may be a mobile phone, a tablet computer, a notebook, or the like.

In some embodiments, the method may further include: the vehicle mounted system establishing connection with the mobile communication device. In some embodiments, the connection may be wireless connection, such as by Bluetooth, Wi-Fi, etc. In some embodiments, the connection may be wired connection, such as by USB, IEEE 1394, etc.

In some embodiments, the first piece of information and the request may be forwarded to a server by the mobile communication device.

In some embodiments, the first piece of information may include hardware condition of the vehicle mounted system. In some embodiments, the first piece of information may include model number of the vehicle mounted system, and the mobile communication device or a server that provides the on-line service may obtain information of capability of the vehicle mounted system based on a look-up table using the model number of the vehicle mounted system. In some embodiments, the first piece of information may include model number of a display of the vehicle mounted system, and the mobile communication device or the server that provides the on-line service may obtain specification of the display based on a look-up table using the model number of the display.

In some embodiments, the on-line service may be an on-line radio service.

In some embodiments, the processing may include: decoding, decompressing, formatting transforming, or deleting, or any combination thereof. In some embodiments, the on-line service may be an on-line radio service providing audio data and image data, and processing the audio data and the image data may include transforming format of the audio data into a format supported by the vehicle mounted system. In some embodiments, processing the audio data and the image data may include processing the image data according to specification of the display of the vehicle mounted system.

According to one embodiment, a method for sending on-line service is provided. The method may include: a mobile communication device receiving, from a vehicle mounted system, a first piece of information about capability of the vehicle mounted system and a request for an on-line service; the mobile communication device obtaining data of the on-line service; the mobile communication device processing the data of the on-line service to match the capability of the vehicle mounted system to obtain contents of the on-line service; and the mobile communication device sending the contents of the on-line service to the vehicle mounted system.

In some embodiments, the mobile communication device may be a mobile phone, a tablet computer, a notebook, or the like.

In some embodiments, the first piece of information may include hardware condition of the vehicle mounted system. In some embodiments, the first piece of information may include model number of the vehicle mounted system, and the mobile communication device may obtain information of capability of the vehicle mounted system based on a look-up table using the model number of the vehicle mounted system. In some embodiments, the first piece of information may include model number of a display of the vehicle mounted system, and the mobile communication device may obtain specification of the display based on a look-up table using the model number of the display.

In some embodiments, the mobile communication device may forward the request to a server and obtain the data of the on-line service from the server. In some embodiments, the on-line service may be an on-line radio service.

In some embodiments, the processing may include: decoding, decompressing, formatting transforming, or deleting, or any combination thereof. In some embodiments, the on-line service may be an on-line radio service providing audio data and image data, and processing the audio data and the image data may include transforming format of the audio data into a format supported by the vehicle mounted system. In some embodiments, processing the audio data and the image data may include processing the image data according to specification of the display of the vehicle mounted system.

According to one embodiment, a method for sending on-line service is provided. The method may include: a server receiving, from a mobile communication device, a request for an on-line service and a first piece information about capability of a vehicle mounted system; the server obtaining data of the on-line service according to the request; the server processing the data of the on-line service to match the capability of the vehicle mounted system to obtain contents of the on-line service; and the server sending the contents of the on-line service to the mobile communication device.

In some embodiments, the mobile communication device may be a mobile phone, a tablet computer, a notebook, or the like.

In some embodiments, the first piece of information may include hardware condition of the vehicle mounted system. In some embodiments, the first piece of information may include model number of the vehicle mounted system, and the server may obtain information of capability of the vehicle mounted system based on a look-up table using the model number of the vehicle mounted system. In some embodiments, the first piece of information may include model number of a display of the vehicle mounted system, and the server may obtain specification of the display based on a look-up table using the model number of the display.

In some embodiments, the on-line service may be an on-line radio service.

In some embodiments, the processing may include: decoding, decompressing, formatting transforming, or deleting, or any combination thereof. In some embodiments, the on-line service may be an on-line radio service providing audio data and image data, and processing the audio data and the image data may include transforming format of the audio data into a format supported by the vehicle mounted system. In some embodiments, processing the audio data and the image data may include processing the image data according to specification of the display of the vehicle mounted system.

According to one embodiment, a vehicle mounted system for obtaining on-line service is provided. The vehicle mounted system may include a communication device, a playback device and a processing device, where the processing device is configured to: generate a first piece of information about capability of the vehicle mounted system and a request for an on-line service; control the communication device to send the first piece of information and the request to a mobile communication device; and control the playback device to present contents of the on-line service received by the communication device from the mobile communication device, where the contents of the on-line service are obtained by processing to match the capability of the vehicle mounted system.

In some embodiments, the processing device may be configured to include hardware condition of the vehicle mounted system into the first piece of information. In some embodiments, the processing device may be configured to include model number of the vehicle mounted system into the first piece of information. In some embodiments, the processing device may be configured to include model number of the playback device into the first piece of information.

According to one embodiment, a mobile communication device for sending on-line service is provided. The mobile communication device may include a communication device and a processing device, where the processing device may be configured to: obtain a request for an on-line service and a first piece of information about capability of a vehicle mounted system through the communication device; obtain data of the on-line service according to the request; process the data of the on-line service to match the capability of the vehicle mounted system to form contents of the on-line service; and control the communication device to send the contents of the on-line service to the vehicle mounted system.

In some embodiments, the mobile communication device may be a mobile phone, a tablet computer, a notebook, or the like.

In some embodiments, the first piece of information may include hardware condition of the vehicle mounted system. In some embodiments, the first piece of information may include model number of the vehicle mounted system, and the processing device may be configured to: obtain information of capability of the vehicle mounted system based on a look-up table using the model number of the vehicle mounted system. In some embodiments, the first piece of information may include model number of a display of the vehicle mounted system, and the processing device may be configured to: obtain specification of the display based on a look-up table using the model number of the display.

In some embodiments, the processing device may be configured to: implement decoding, decompressing, formatting transforming, or deleting, or any combination thereof to process the data of the on-line service. In some embodiments, the on-line service may be an on-line radio service providing audio data and image data, and the processing device may be configured to transform format of the audio data into a format supported by the vehicle mounted system. In some embodiments, the processing device may be configured to process the image data according to specification of the display of the vehicle mounted system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
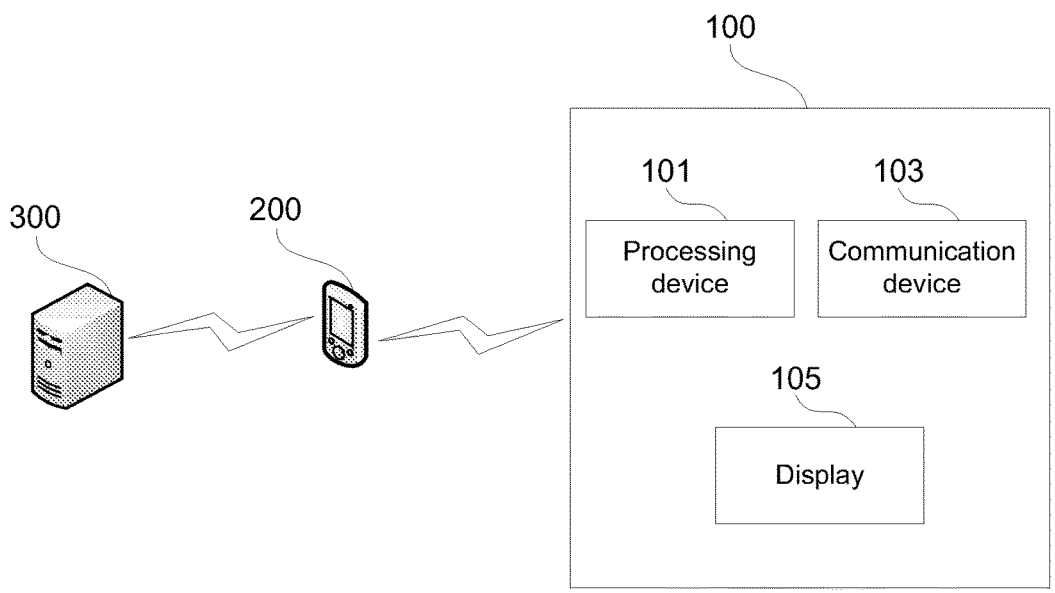
FIG. 1 illustrates a schematic block diagram of a vehicle mounted system 100 for obtaining on-line service according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 illustrates a schematic block diagram of a vehicle mounted system 100 for obtaining on-line service according to one embodiment. The vehicle mounted system 100 may include a processing device 101, a communication device 103 and a playback device such as a display 105. In some embodiments, the vehicle mounted system 100 may be a vehicle mounted head unit. The processing device 101 may control the communication device 103 to establish data communication with a mobile/portable communication device 200, such as a mobile phone, a tablet computer, a notebook, or the like. The data communication between the communication device 103 and the mobile communication device 200 may be established through wireless data connection, such as by Wi-Fi, Bluetooth, or the like, or through wired data connection, such as by USB, IEEE 1394, or the like. The mobile communication device 200 is capable of receiving on-line data from a server 300 through a wireless network. In some embodiments, the mobile communication device 200 may have a 3G module, such that it may obtain on-line data through mobile network connection. As such, the vehicle mounted system 100 may receive on-line data through the mobile communication device 200. Detail configuration of the vehicle mounted system 100, the mobile communication device 200 and the server 300 will be illustrated hereinafter in conjunction with operation processes.

Figure 2:
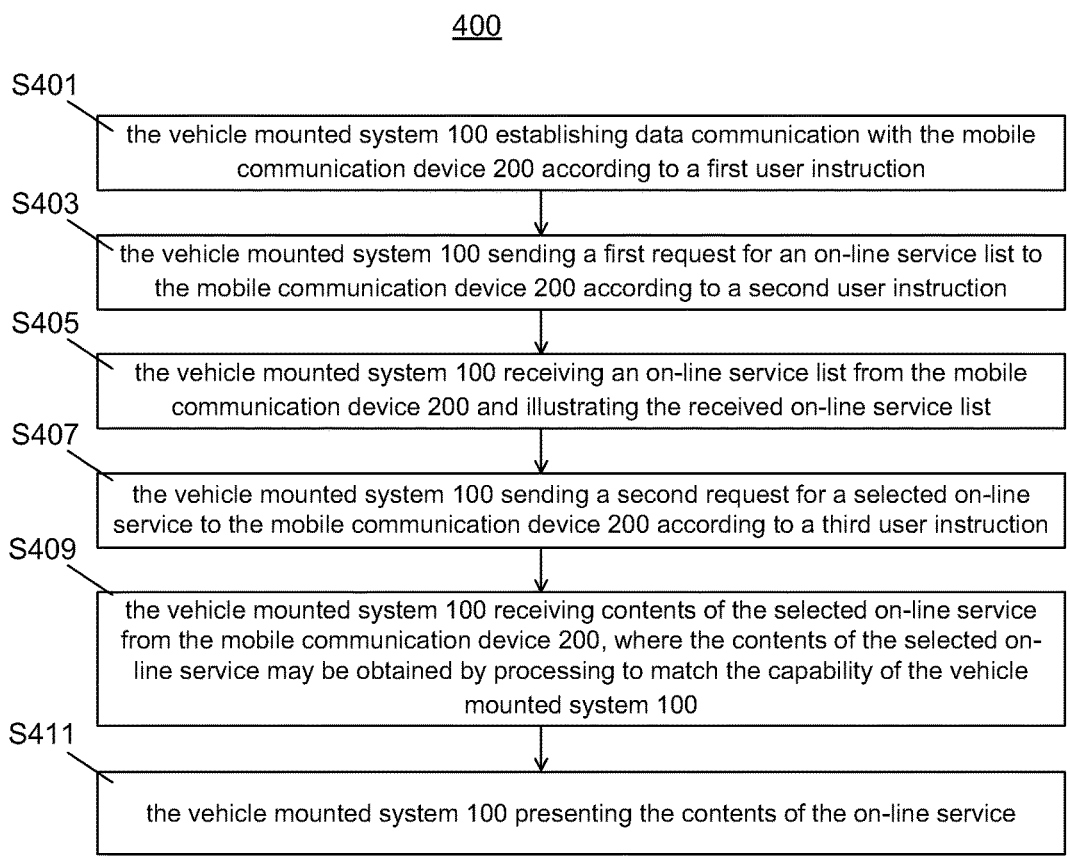
FIG. 2 schematically illustrates a flow chart of a process 400 for obtaining on-line service according to one embodiment.

FIG. 2 schematically illustrates a flow chart of a process 400 for obtaining on-line service according to one embodiment.

In S401, the vehicle mounted system 100 establishing data communication with the mobile communication device 200 according to a first user instruction.

Figure 3:
FIG. 3 schematically illustrates an example of a first interface 500 of the vehicle mounted system 100.

FIG. 3 schematically illustrates an example of a first interface 500 of the vehicle mounted system 100. In some embodiments, the processing device 101 may control the display 105 to illustrate the first interface 500 to a user in the vehicle. The first interface 500 may include an APP option 501, a left arrow 503 and a right arrow 505. If the user chooses the APP option 501, the first user instruction of using mobile communication device source may be inputted. According to the first user instruction, the processing device 101 may control the communication device 103 to establish data communication with the mobile communication device 200. If the user chooses the left arrow 503 or the right arrow 505, the first interface 500 may provide other options.

In some embodiments, the vehicle mounted system 100 may send a first piece of information about capability of the vehicle mounted system to the mobile communication device 200. In some embodiments, the mobile communication device 200 may forward the first piece of information to the server 300. In following processing, the mobile communication device 200 and/or the server 300 may process on-line data to be sent to the vehicle mounted system 100 to match the capability of the vehicle mounted system 100, such that the processed on-line data may be more suitable for the vehicle mounted system 100 to use. In some embodiment, the mobile communication device 200 and/or the server 300 may generate an identification code, establish a mapping between the received first piece of information and the identification code, and send the identification code to the vehicle mounted system 100. As such, the vehicle mounted system 100 may send requests for on-line data together with the identification code. Based on the mapping between the identification code and the first piece of information, the mobile communication device 200 and/or the server 300 can implement corresponding processing.

In some embodiments, the first piece of information 100 may include hardware condition of the vehicle mounted system 100. In some embodiments, the hardware condition may include a model number of the vehicle mounted system 100, or a model number of the display 105. For example, the display 105 may be a relatively small lattice display which only can illustrate a few colours. The model number of the display 105 may be sent to the second communication 200 and/or the server 300, such that large pictures with rich colours provided from an on-line service can be processed therein to match the condition of the display 105. In some embodiments, the first piece of information may include software condition of the vehicle mounted system 100. For example, the vehicle mounted system 100 may be a vehicle-mounted head unit which has an audio player. Some audio data with certain formats may not be recognized by the audio player. Therefore, data format supported by the audio player may be sent to the second communication 200 and/or the server 300, such that audio data from the on-line service may be processed therein.

In S403, the vehicle mounted system 100 sending a first request for an on-line service list to the mobile communication device 200 according to a second user instruction.

Figure 4:
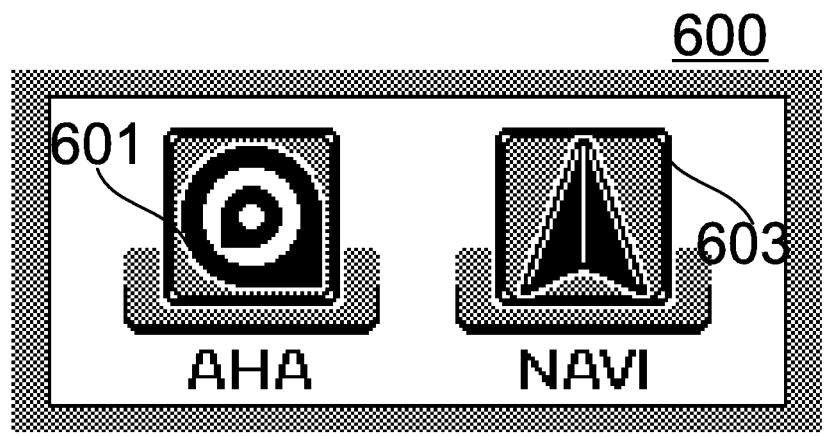
FIG. 4 schematically illustrates an example of a second interface 600 of the vehicle mounted system 100.

FIG. 4 schematically illustrates an example of a second interface 600 of the vehicle mounted system 100. In some embodiments, the processing device 101 may control the display 105 to illustrate the second interface 600 to the user. The second interface 600 may include options representing available services. For example, an AHA option 601 may represent on-line radio service from an AHA radio server, and a NAVI option 603 may represent a navigation service. If the user chooses the AHA option 601, a user instruction of obtaining on-line radio service may be inputted. Accordingly, the processing device 101 may generate a request for obtaining a list of available on-line radios to the mobile communication device 200.

In some embodiments, the vehicle mounted system 100 may send the first request together with the identification code to the mobile communication device 200.

In S405, the vehicle mounted system 100 receiving an on-line service list from the mobile communication device 200 and illustrating the received on-line service list.

In some embodiments, the mobile communication device 200 may forward the first request to the server 300. The server 300 may obtain a list listing out available services, such as available on-line radio stations, and send the list to the mobile communication device 200. As such, the vehicle mounted system 100 may receive the list. In some embodiments, an on-line service list may be pre-stored in the mobile communication device 200, and the mobile communication device 200 may send the pre-stored on-line service list to the vehicle mounted system 100 according to the first request.

In some embodiments, the mobile communication device 200 and/or the server 300 may process the on-line service list to be sent to the vehicle mounted system 100 based on the first piece of information. In some embodiments, the first piece of information may include model number of the vehicle mounted system 100, the mobile communication device 200 and/or the server 300 may obtain information of capability of the vehicle mounted system 100 based on a first look-up table using the model number of the vehicle mounted system 100. In some embodiments, the first piece of information may include model number of the display 105, the mobile communication device 200 and/or the server 300 may obtain specification of the display 105 based on a second look-up table using the model number of the display 105. In some embodiments, protocols may be predefined in the mobile communication device 200 and/or the server 300, which protocols may control the mobile communication device 200 and/or the server 300 to process the on-line service list to be sent to the vehicle mounted system 100 based on the capability of the vehicle mounted system 100. For example, some services may be cancelled from the list because they can not be used by the vehicle mounted system 100.

Figure 5:
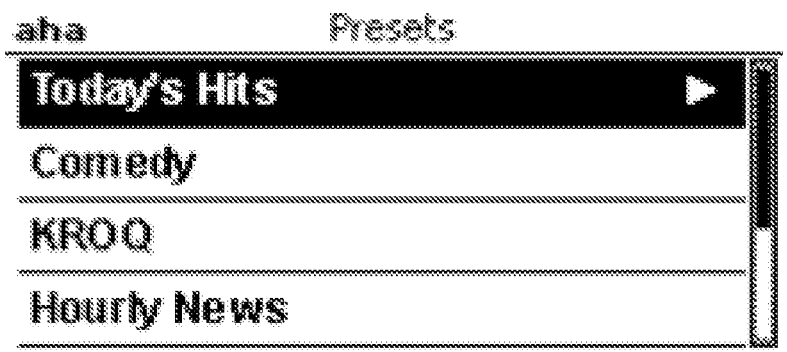
FIG. 5 schematically illustrates an example of a third interface 700 of the vehicle mounted system 100.

The vehicle mounted system 100 may illustrates the received on-line service list to the user, such that the user can select one from the list. In some embodiments, the processing device 101 may control the display 105 to illustrate the received on-line service list. FIG. 5 schematically illustrates an example of a third interface 700 of the vehicle mounted system 100. The third interface 700 may illustrate options representing a part of available services listed in the received on-line service list.

In S407, the vehicle mounted system 100 sending a second request for a selected on-line service to the mobile communication device 200 according to a third user instruction.

The user may select an option in the third interface 700. A corresponding instruction may be inputted, according to which the vehicle mounted system 100 may generate a request for an on-line service corresponding to the selected option.

In some embodiments, the vehicle mounted system 100 may send the second request together with the identification code to the mobile communication device 200.

In S409, the vehicle mounted system 100 receiving contents of the selected on-line service from the mobile communication device 200, where the contents of the selected on-line service may be obtained by processing to match the capability of the vehicle mounted system 100.

The mobile communication device 200 may forward the second request to the server 300. In some embodiments, the second request may be sent to the server 300 together with the identification code. According to the second request, the server 300 may obtain data of the selected on-line service. In some embodiments, the server 300 may obtain the data of the selected on-line service from itself. In some embodiments, the server 300 may obtain the data of the selected on-line service from another server. For example, the server 300 may be an AHA radio server. If the user selects an on-line radio service from BBC, the AHA radio server may obtain data of BBC on-line radio service from a BBC server.

The data of the selected on-line service may include various contents and may have various formats. Some of the on-line service data are probably not able to be used by the vehicle mounted system 100 easily. For example, the vehicle mounted system 100 may be a vehicle-mounted head unit with limited data computation capability. However, the on-line service data may be encoded and compressed, so using these data may increase computation load of the head unit. Further, some visible and audio contents may not be supported by a media player embedded in the head unit. Some utilization, such as presenting a comment, may not be supported by vehicle components. To reduce the computation load of the head unit, reduce data transmission and implement better utilization, the data of the selected on-line service may be processed based on the first piece of information to match the capability of the vehicle mounted system 100. Contents which are suitable for the vehicle mounted system 100 to use may be formed by such processing. Therefore, even if the head unit has a relatively low configuration, it still can use these contents. In some embodiments, processing the data of the selected on-line service may be implemented by the server 300, the mobile communication device 200, or a combination thereof.

In some embodiments, processing the selected on-line service may include: decoding, decompressing, format transforming, data deleting, or a combination thereof. In some embodiments, protocols may be predefined, which protocols may control the mobile communication device 200 and/or the server 300 to process the data of the selected on-line service based on the identification code sent together with the second request and the pre-established mapping.

In some embodiments, the on-line service may be an on-line radio service providing audio data and image data, and processing the audio data and the image data may include transforming format of the audio data into a format supported by the audio player of the vehicle mounted system 100. In some embodiments, processing the audio data and the image data may include processing the image data based on resolution of the display 105, for example, deleting some of the image data which are not suitable for the display 105 to present. In some embodiments, data for implementing utilization like "making a comment" may be deleted, or processed to form data for implementing utilization like "posting a support or not".

In S411, the vehicle mounted system 100 presenting the contents of the on-line service.

The vehicle mounted system 100 may present the contents of the on-line service or control other components to present the contents of the on-line service.

Figure 6:
FIG. 6 schematically illustrates an example of a fourth interface 800 of the vehicle mounted system 100.

FIG. 6 schematically illustrates an example of a fourth interface 800 of the vehicle mounted system 100. The fourth interface 800 may illustrate visible contents formed by processing the first set of data. In some embodiments, the processing device 101 may control the display 107 to show the visible contents. In some embodiments, the processing device 101 may control an audio system to play audio contents formed by processing the first set of data.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A method for obtaining on-line service, comprising:
   transmitting to a mobile communication device coupled to a vehicle mounted system a first piece of information about a capability of the vehicle mounted system and a request for an on-line service, wherein the first piece of information comprises a hardware condition of the vehicle mounted system that includes a first model number of the vehicle mounted system, the first model number being distinct from a second model number of a display included in the vehicle mounted system; and receiving contents of the requested on-line service from the mobile communication device, wherein the contents of the requested on-line service are determined through matching the capability of the vehicle mounted system, and the capability of the vehicle mounted system is obtained based on a look-up table using at least the first model number included in the hardware condition of the vehicle mounted system.

2. The method according to claim 1, wherein the mobile communication device or a server that provides the requested on-line service obtains information about the capability of the vehicle mounted system based on the look-up table using the first model number of the vehicle mounted system included in the hardware condition.

3. The method according to claim 1, wherein the mobile communication device or a server that provides the requested on-line service obtains a specification for the display based on a look-up table using the second model number of the display included in the hardware condition.

4. The method according to claim 1, wherein matching the capability of the vehicle mounted system comprises at least one of a decoding operation, a decompression operation, a formatting transformation operation, and a deleting operation.

5. The method according to claim 1, wherein the requested on-line service comprises an on-line radio service providing audio data, and further comprising transforming, by the mobile communication device or a server that provides the requested on-line service, a format associated with the audio data into a format supported by the vehicle mounted system.

6. The method according to claim 1, wherein the requested on-line service comprises an on-line radio service providing audio data and video data, and further comprising processing, by the mobile communication device or a server that provides the requested on-line service, the video data according to a specification of a display of the vehicle mounted system.

7. The method according to claim 1, wherein data of the requested on-line service comprises multiple different types of media contents having multiple different formats that comprise multiple different data encoding formats.

8. The method according to claim 1, wherein the requested on-line service is selected from a list of available on-line services that has been generated based on the capability of the vehicle mounted system.

9. The method according to claim 8, wherein the list of available on-line services is generated based on the capability of the vehicle mounted system by removing one or more on-line services that cannot be used by the vehicle mounted system.

10. A method comprising:
receiving a first piece of information about a capability of a vehicle mounted system and a request for an on-line service, wherein the first piece of information comprises a hardware condition of the vehicle mounted system that includes a first model number of the vehicle mounted system, the first model number being distinct from a second model number of a display included in the vehicle mounted system;
obtaining data associated with the requested on-line service;
processing the data associated with the requested on-line service to match the capability of the vehicle mounted system to obtain contents of the requested on-line service, wherein the capability of the vehicle mounted system is obtained based on a look-up table using at least the first model number included in the hardware condition of the vehicle mounted system; and
sending the contents of the requested on-line service to the vehicle mounted system.

11. The method according to claim 10, further comprising obtaining information about the capability of the vehicle mounted system based on a look-up table using the first model number of the vehicle mounted system included in the hardware condition.

12. The method according to claim 10, further comprising obtaining a specification of the display based on the look-up table using the second model number of the display included in the hardware condition.

13. The method according to claim 10, wherein the processing comprises at least one of a decoding operation, a decompression operation, a formatting transformation operation, or a deleting operation.

14. The method according to claim 10, wherein the requested on-line service comprises an on-line radio service providing audio data, and further comprising transforming, by the mobile communication device or a server that provides the requested on-line service, a format associated with the audio data into a format supported by the vehicle mounted system.

15. The method according to claim 10, wherein the requested on-line service comprises an on-line radio service providing audio data and image data, and further comprising processing, by the mobile communication device or a server that provides the requested on-line service, the image data according to a specification of a display of the vehicle mounted system.

16. A vehicle-mounted system for obtaining on-line service, comprising:
a communication device;
a playback device; and
a processing device configured to:
generate a first piece of information about a capability of the vehicle mounted system and a request for an on-line service, wherein the first piece of information comprises a hardware condition of the vehicle mounted system that includes a first model number of the vehicle mounted system, the first model number being distinct from a second model number of a display included in the vehicle mounted system;
cause the communication device to send the first piece of information and the request to a mobile communication device; and
cause the playback device to present contents of the requested on-line service received by the communication device from the mobile communication device, wherein the contents of the requested on-line service are determined through matching the capability of the vehicle mounted system, and the capability of the vehicle mounted system is obtained based on a look-up table using at least the first model number included in the hardware condition of the vehicle mounted system.

* * * * *

UNITED STATES PATENT AND TRADEMARK OFFICE
CERTIFICATE OF CORRECTION

PATENT NO. : 9,935,667 B2  
APPLICATION NO. : 14/646716  
DATED : April 3, 2018  
INVENTOR(S) : Jianjun Ma, Xiaopei Huang and Jian Kang Page 1 of 1

It is certified that error appears in the above-identified patent and that said Letters Patent is hereby corrected as shown below:

On the Title Page

(73) Assignee:
Please delete "HARMAN INTERNATIONAL INDUSTIRES, INCORPORATED" and insert
--HARMAN INTERNATIONAL INDUSTRIES, INCORPORATED--.

Signed and Sealed this
Sixth Day of November, 2018

Andrei Iancu
*Director of the United States Patent and Trademark Office*